United States Patent [19]

Owen et al.

[11] Patent Number: 5,032,251

[45] Date of Patent: Jul. 16, 1991

[54] PROCESS AND APPARATUS FOR FAST FLUIDIZED BED REGENERATION OF CATALYST IN A BUBBLING BED CATALYST REGENERATOR

[75] Inventors: Hartley Owen, Belle Mead, N.J.; Paul H. Schipper, Wilmington, Del.

[73] Assignee: Mobil Oil Corporation, Fairfax, Va.

[21] Appl. No.: 515,930

[22] Filed: Apr. 27, 1990

[51] Int. Cl.⁵ .................... C10G 11/00; C10G 35/10; B01J 20/34

[52] U.S. Cl. .................... 208/113; 208/158; 208/159; 208/160; 208/164; 502/40; 502/43; 502/44

[58] Field of Search ............... 208/113, 158, 159, 160, 208/164; 502/40, 43, 44

[56] References Cited

U.S. PATENT DOCUMENTS 4,812,430  3/1989  Child .................................. 208/164

OTHER PUBLICATIONS

*Oil and Gas Journal*, "Fluid Catalytic Cracking Report" by Amos A. Avidan, Michael Edwards, and Hartley Owen.

Primary Examiner—Anthony McFarlane
Assistant Examiner—Nhat Phan
Attorney, Agent, or Firm—Alexander J. McKillop; Charles J. Speciale; Richard D. Stone

[57] ABSTRACT

A process and apparatus for achieving turbulent or fast fluidized bed regeneration of spent FCC catalyst in a bubbling bed regenerator having a stripper mounted over the regenerator and a stripped catalyst standpipe within the regenerator. A closed coke combustor vessel is added to the existing regenerator vessel, and spent catalyst is discharged into the coke combustor and regenerated in a turbulent or fast fluidized bed, and discharged up into a dilute phase transport which preferably encompasses, and is in a countercurrent heat exchange relationship with, the spent catalyst standpipe. Regenerated catalyst is discharged from the dilute phase transport riser, and collected in the bubbling dense bed surrounding the coke combustor. Catalyst may be recycled from the dense bed to the coke combustor for direct contact heat exchange. Catalyst coolers may be used on catalyst recycle lines to the coke combustor, or on the line returning regenerated catalyst to the cracking reactor.

18 Claims, 3 Drawing Sheets

PROCESS AND APPARATUS FOR FAST FLUIDIZED BED REGENERATION OF CATALYST IN A BUBBLING BED CATALYST REGENERATOR

BACKGROUND OF THE INVENTION

1. Field of the Invention

The invention relates to a process and apparatus for the regeneration of fluidized catalytic cracking catalyst.

2. Description of Related Art

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.-600° C., usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C. -900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the Oil & Gas Journal.

Modern catalytic cracking units use active zeolite catalyst to crack the heavy hydrocarbon feed to lighter, more valuable products. Instead of dense bed cracking, with a hydrocarbon residence time of 20–60 seconds, much less contact time is needed. The desired conversion of feed can now be achieved in much less time, and more selectively, in a dilute phase, riser reactor.

Although reactor residence time has continued to decrease, the height of the reactors has not. Although the overall size and height of much of the hardware associated with the FCC unit has decreased, the use of all riser reactors has resulted in catalyst and cracked product being discharged from the riser reactor at a fairly high elevation. This elevation makes it easy for a designer to transport spent catalyst from the riser outlet, to a catalyst stripper at a lower elevation, to a regenerator at a still lower elevation.

The need for a somewhat vertical design, to accommodate the great height of the riser reactor, and the need to have a unit which is compact, efficient, and has a small "footprint", has caused considerable evolution in the design of FCC units, which evolution is reported to a limited extent in the Jan. 8, 1990 Oil & Gas Journal article. One modern, compact FCC design is the Kellogg Ultra Orthoflow converter, Model F, which is shown in FIG. 1 of this patent application, and also shown as FIG. 17 of the Jan. 8, 1990 Oil & Gas Journal article discussed above. The compact nature of the design, and the use of a catalyst stripper which is contiguous with and supported by the catalyst regenerator, makes it difficult to expand or modify such units. This means that the large, bubbling dense bed regenerator is relatively difficult to modify, in that it is not easy to increase height much. As the regenerator vessel usually is at or near grade level, it is difficult to do more than minor modifications under the regenerator.

Although such a unit works well in practice, the use of a bubbling bed regenerator is inherently inefficient, and troubled by the presence of large bubbles, poor catalyst circulation, and the presence of stagnant regions. The bubbling bed regenerators usually have much larger catalyst inventories, and longer catalyst residence times, to allow an increase in residence time make up for a lack of efficiency.

For such units, characterized by a stripper mounted over, and partially supported by, a bubbling dense bed regenerator, there has been no good way to achieve the benefits of high efficiency regeneration, in a fast fluidized bed (FFB) region.

We studied this design, and realized that there was a way to achieve the benefits of FFB coke combustion, while retaining most of the original design. We were even able to obtain some improvements, which made our modified design more efficient, in some ways, that either the original dense bed design or as compared to a more modern high efficiency regenerator design (H.E.R.).

BRIEF SUMMARY OF THE INVENTION

Accordingly, the present invention provides a process for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst to which an oxygen containing regeneration gas is added and from which hot regenerated catalyst is withdrawn and recycled to said riser reactor, characterized by: discharging said stripped catalyst from said catalyst standpipe into a closed coke combustor vessel which is at least partially immersed in said bubbling dense bed, said coke combustor vessel having a base region with a cross sectional area and an upper region of reduced cross sectional area relative to said base region; adding an oxygen containing regeneration gas to said coke combustor vessel in an amount sufficient to provide a superficial vapor velocity which will maintain a majority of the catalyst therein in a state of turbulent or fast fluidization; transferring said catalyst from said base region of said coke combustor to said upper region of said coke combustor having a reduced cross sectional area, whereby increasing the superficial vapor velocity and causing dilute phase catalyst transport in said upper region; discharging at least partially regenerated catalyst from said upper region into a dilute phase transport riser connective with said coke combustor vessel, said dilute phase transport riser extending into said dilute phase region within said regenerator vessel containing said bubbling fluidized bed; and discharging regenerated catalyst from said dilute phase transport riser and collecting said regenerated catalyst in said bubbling fluidized bed.

In another embodiment, the present invention provides a process for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst to which an oxygen containing regeneration gas is added and from which hot regenerated catalyst is withdrawn and recycled to said riser reactor, characterized by: heating said stripped catalyst, by countercurrent indirect heat exchange with a dilute phase of at least partially regenerated catalyst, is said stripped catalyst standpipe; discharging said heated stripped catalyst into a closed coke combustor vessel which is at least partially immersed in said bubbling dense bed, said coke combustor vessel having a base region with a cross sectional area and an upper region of reduced cross sectional area relative to said base region; adding an oxygen containing regeneration gas to said coke combustor vessel in an amount sufficient to burn coke from said catalyst and to heat the catalyst as a result of coke combustion, and in an amount sufficient to provide a superficial vapor velocity which will maintain a majority of the catalyst therein as a fast fluidized bed; transferring catalyst from said fast fluidized bed region to said upper region of said coke combustor having a reduced cross sectional area, whereby increasing the superficial vapor velocity and causing dilute phase catalyst transport in said upper region; discharging at least partially regenerated catalyst from said upper region into a dilute phase transport riser connective with said coke combustor vessel, said dilute phase transport riser extending into said dilute phase region within said regenerator vessel containing said bubbling fluidized bed and being axially aligned with, and enclosing, a majority of said stripped catalyst standpipe; and discharging regenerated catalyst from said dilute phase transport riser and collecting said regenerated catalyst in said bubbling fluidized bed.

In an apparatus embodiment, the present invention provides an apparatus for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst to which an oxygen containing regeneration gas is added and from which hot regenerated catalyst is withdrawn and recycled to said riser reactor, said regeneration zone characterized by: a stripper catalyst standpipe having a stripped catalyst inlet connective with said catalyst stripper and an outlet, said standpipe being axially aligned with and enclosed by a dilute phase transport riser, and wherein said stripper catalyst standpipe outlet discharges stripped catalyst into a closed coke combustor vessel which is at least partially immersed in said bubbling dense bed; said coke combustor vessel having a base region with a cross sectional area and an upper region of reduced cross sectional area relative to said base region; and said base region is connected to a means for addition of regeneration gas into said coke combustor vessel, and said upper region is connective with a vertical pipe which is axially aligned with and encompasses said stripped catalyst standpipe; and said vertical pipe has an inlet at the base thereof connective with said upper region of said coke combustor and an outlet at an upper portion thereof adapted to discharge regenerated catalyst and regeneration flue gas into said dilute phase region in said regenerator whereby regenerated catalyst is discharged into said regenerator.

DESCRIPTION OF PREFERRED EMBODIMENTS

Figure 1:
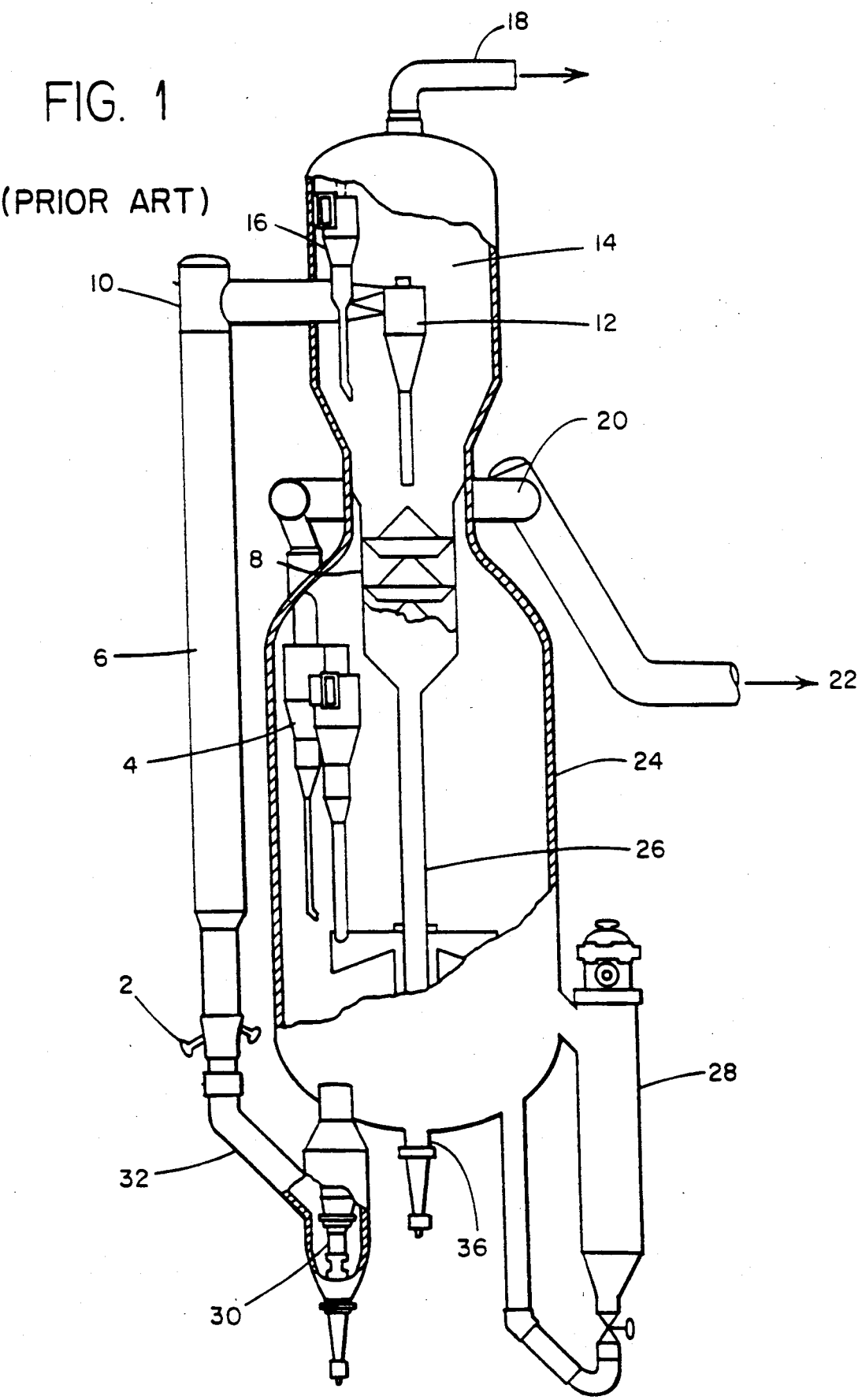
FIG. 1 (prior art) is a schematic view of a conventional fluidized catalytic cracking unit.

FIG. 1 is a simplified schematic view of an FCC unit of the prior art, similar to the Kellogg Ultra Orthoflow converter Model F shown as FIG. 17 of Fluid Catalytic Cracking Report, in the Jan. 8, 1990 edition of Oil & Gas Journal.

A heavy feed such as a gas oil, vacuum gas oil is added to riser reactor 6 via feed injection nozzles 2. The cracking reaction is completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14, and eventually is removed via upper cyclones 16 and conduit 18 to the fractionator.

Spent catalyst is discharged down from a dipleg of riser cyclones 12 into catalyst stripper 8, where one, or preferably 2 or more, stages of steam stripping occur, with stripping steam admitted by means not shown in the figure. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so that heat may be removed from the regenerator, if desired. Regenerated catalyst is withdrawn from the regenerator via regenerated catalyst plug valve assembly 30 and discharged via lateral 32 into the base of the riser reactor 6 to contact and crack fresh feed injected via injectors 2, as previously discussed. Flue gas, and some entrained catalyst, are discharged into a dilute phase region in the upper portion of regenerator 24. Entrained catalyst is separated from flue gas in multiple stages of cyclones 4, and discharged via outlets 8 into plenum 20 for discharge to the flare via line 22.

Figure 2:
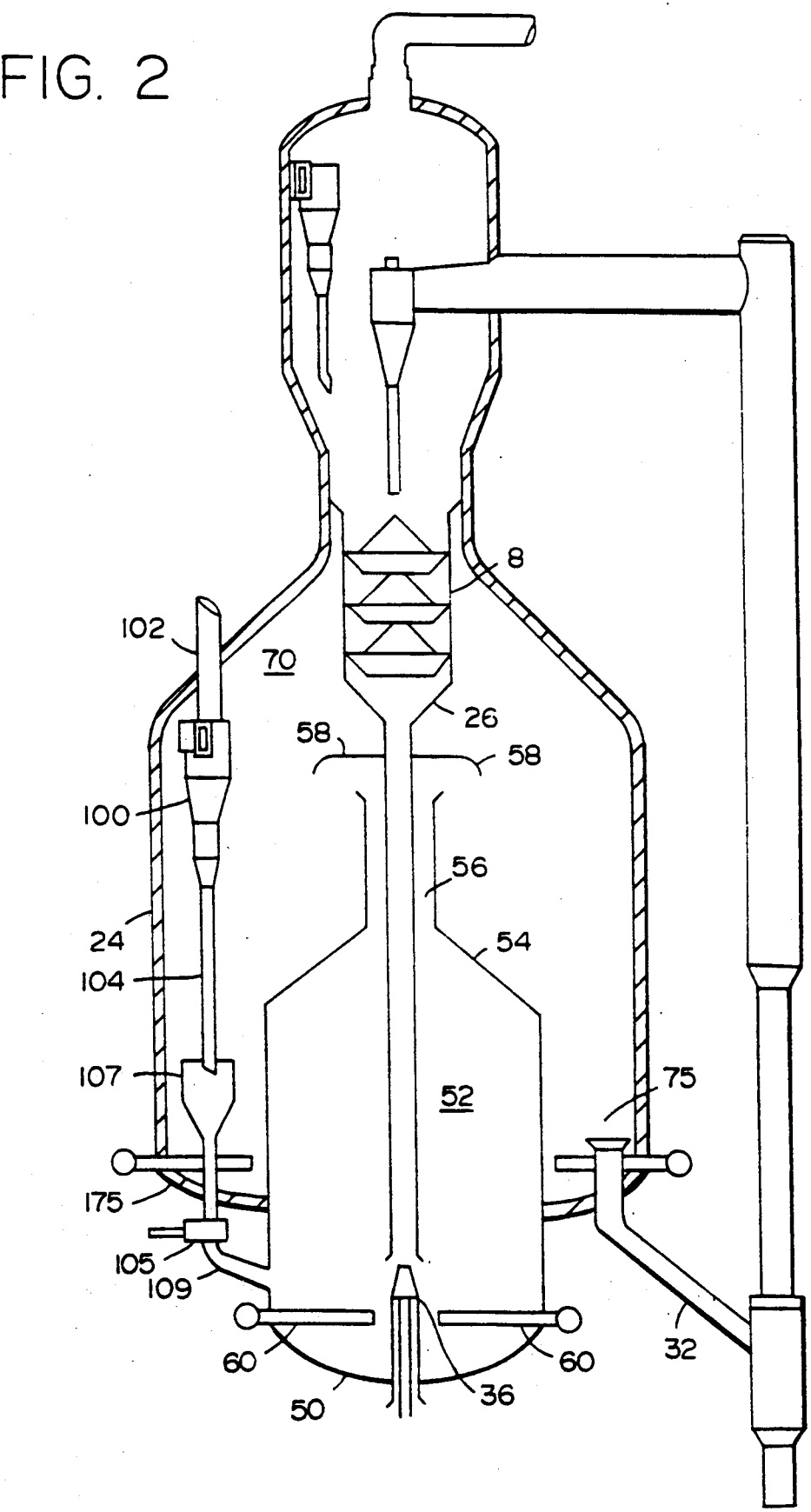
FIG. 2 (invention) is a schematic view of a regenerator of the invention, with a FFB region added to the base of the regenerator.

In FIG. 2 (invention) only the changes made to the old regenerator shell 24 are shown. Like elements in FIG. 1 and 2 have like numerals.

A high efficiency regenerator pod 50 is added to the base of, or passes through, the base of the old regenerator vessel 24. Stripped catalyst from the catalyst stripper 8 is discharged via stripper dipleg 26 down into regenerator pod 50. The catalyst is discharged into a fast fluidized bed region 52, where incoming spent catalyst contacts regeneration gas, usually air, added via multiple inlets 60. Although only a single level of air admission is shown, it is possible to add air at many places in the design, ranging from the very bottom of the FFB region in vessel 52, to multiple elevations of air injection within vessel 52, or near the top of vessel 52.

In vessel 52 the air admission rate, and the cross-sectional area available for flow, and catalyst addition and catalyst recycle, if any, are adjusted to maintain much or all of the bed in a "fast fluidized condition", characterized by intense agitation, relatively small bubbles, and rapid coke combustion. In terms of superficial vapor velocity and typical FCC catalyst sizes, this means the vapor velocity should exceed 3.5 feet per second, and preferably is 4–15 feet per second, and most preferably is 4–10 feet per second. The catalyst density in a majority of the volume in the coke combustor will be less than 35 pounds/cubic foot, and preferably less than 30 pounds/cubic foot, and ideally about 25 pounds/cubic foot, and even less in the upper regions of the coke combustor, where the diameter of the vessel decreases, as indicated generally at 54.

The densities and superficial vapor velocities discussed herein presume that the unit operates at a pressure where the vast majority of FCC units operate, namely 25–40 psig. A few might operate at slightly lower pressures, and a significant minority may operate at somewhat higher pressures, primarily those with power recovery systems. Changes in pressure change the superficial vapor velocity needed to maintain, e.g., a fast fluidized bed or a bubbling dense bed. It is easy to calculate the superficial vapor velocity needed to support a given type of fluidization, and the bed density expected at those conditions. In general, an increase in pressure will decrease the superficial vapor velocity needed to achieve a fast fluidized bed.

The partially regenerated catalyst, and partially consumed combustion gas are discharged out the top of the coke combustor into transition region 54 and from there into a dilute phase transport riser 56, which preferably forms an annulus around the spent catalyst standpipe, as shown in the Figure. Dilute phase conditions promote rapid combustion of CO to CO2, although some additional coke combustion can also be achieved here. Addition of secondary air, to the base of the transport riser, or at higher elevations therein by means not shown, can also be practiced to augment coke or CO combustion. The catalyst and flue gas are discharged into the existing dilute phase space above the prior art dense bed. Preferably a catalyst/flue gas separation means, shown generically as downwardly directing arms or cap 58, is used to separate the bulk of the catalyst form the bulk of the flue gas, and reduce to some extent the catalyst traffic in the dilute phase region 70. Riser cyclones, or a cap 58 much like a bubble cap on a distillation column can be used to achieve the desired catalyst separation. Cyclones can easily achieve greater than 99% separation, but they are expensive and difficult to retrofit. A bubble cap, or downward extending sidearms, can achieve separations of around 90%, which will be satisfactory in this service.

The hot, at least partially regenerated, catalyst is collected as a dense phase fluidized bed 75 in the base of the existing regenerator shell 24. Additional regeneration gas may be added, by air distributor means 175. It is conventional to add some fluffing air, to maintain the dense bed in a fluidized state.

In a preferred feature of the present invention, a significant amount of combustion air is added to bed 75 both to maintain fluidization and achieve a significant amount of coke combustion. Preferably from 5 to 60% of the coke combustion occurs in the bubbling bed, and most preferably from 10 to 40%. Although bed 75 is a typical fluidized bubbling bed, characterized by relatively large stagnant regions, and large bubbles of combustion air which bypass the bed, it is an excellent place to achieve some additional coke combustion. One of the most significant benefits of coke combustion in bubbling bed 75 is the relatively drier atmosphere. There is a lower steam partial pressure in the dense bed 75 of the present invention than in a conventional dense bed regenerator, such as that shown in FIG. 1. Much of the reduction in steam partial pressure is due to the removal of water of combustion, and entrained stripping steam, with the flue gas discharged from the coke combustor. By using a flue gas/catalyst separation means on the transport riser outlet, the relatively high steam content flue gas is separated from the catalyst which is discharged down to form the bubbling fluidized bed. It is also possible to greatly reduce the load on the cyclones above the bubbling dense bed, because much less combustion air, and consequently less entrainment of catalyst into the dilute phase, is needed when only a fraction of the coke combustion occurs in the bubbling dense bed. Even without a separation means such as cap 58, the dense bed region 75 of the present invention will be drier than the dense bed of the regenerator of FIG. 1 (prior art).

Regardless of the amount of coke combustion, if any, in the bubbling dense bed 75, it will be beneficial to recycle some hot regenerated catalyst to the fast fluidized bed region in vessel 52. Catalyst recycle is usually needed to "fire up" the coke combustor, and achieve the high temperatures needed in the coke combustor for efficient coke combustion and to promote afterburning in the dilute phase transport riser. Such recycle can come from the second dense bed 75, or preferably, from the dipleg 104 of a primary cyclone such as cyclone 100, as shown in the drawing. Flue gas is removed from the unit via line 102, while catalyst is discharged from the cyclone into funnel collector 107. Any catalyst not recycled simply overflows into bed 75. This arrangement is beneficial for two reasons, high temperature and head, each of which will be briefly reviewed.

Hot regenerated catalyst recovered from flue gas in a cyclone will be at the very highest temperature in the regenerator, in most instances. When the unit is being pushed hardest, or is upset, there will be more coke combustion shifted into the dense bed region 75 and less in the coke combustor. This will increase somewhat the temperature in bed 75, and in the dilute phase region above it. When the unit is pushed further, with a significant amount of afterburning occurring in the dilute phase region above bed 75, the catalyst recovered from the cyclones can be 50° to 100° F. hotter than bed 75. This means that if the unit get behind in coke burning, and too much coke burning is shifted to dense bed 75, and to the dilute phase region 70, the unit automatically produces hotter catalyst for recycle to the coke combustor. This leads to a hotter coke combustor, and will, if sufficient air is added, lead to high coke burning rates in the coke combustor. In this way the unit is somewhat self adjusting.

Catalyst head is important for moving catalyst from the second dense bed into the coke combustor reliably and controllably. This is difficult because the coke combustor has an elevation close to that of the dense bed 75, and in some units may have a higher elevation than the dense bed. It is difficult and expensive to move catalyst from a lower elevation to a higher elevation. Use of the natural dynamics of an FCC unit, where much of the catalyst inventory is carried or entrained up into the regenerator cyclones, allows some useful work to be performed by this elevated catalyst. The FCC regenerator entrains or sweeps up into the dilute phase region 70, and through the cyclones 100, all of the catalyst inventory in the regenerator every 5-15 minutes in many units. We realized that the cyclones provided a source of catalyst with a large head available to permit controlled transfer of hot regenerated catalyst from the cyclone dipleg to the fast fluidized bed region, with flow control achieved via slide valve 105. Regenerated catalyst is then charged to the FFB region 52 via line 109.

Regenerated catalyst for reuse in the cracking process is withdrawn from dense bed region 75 via plug valve means or a slide valve not shown and transferred to the cracking reactor via line 32.

In many units it will be possible to reduce, and perhaps even eliminate, the recycle of regenerated catalyst to the FFB region. This is because of the countercurrent heat exchange possible between relatively cool spent catalyst in the stripper standpipe and the hotter catalyst in FFB region and in the dilute phase transport riser 56. Use of conductive refractory linings, or other materials of construction which permit heat transfer between dense and dilute catalyst phases, will augment heat transfer between stripped catalyst and regenerated catalyst and flue gas.

Figure 3:
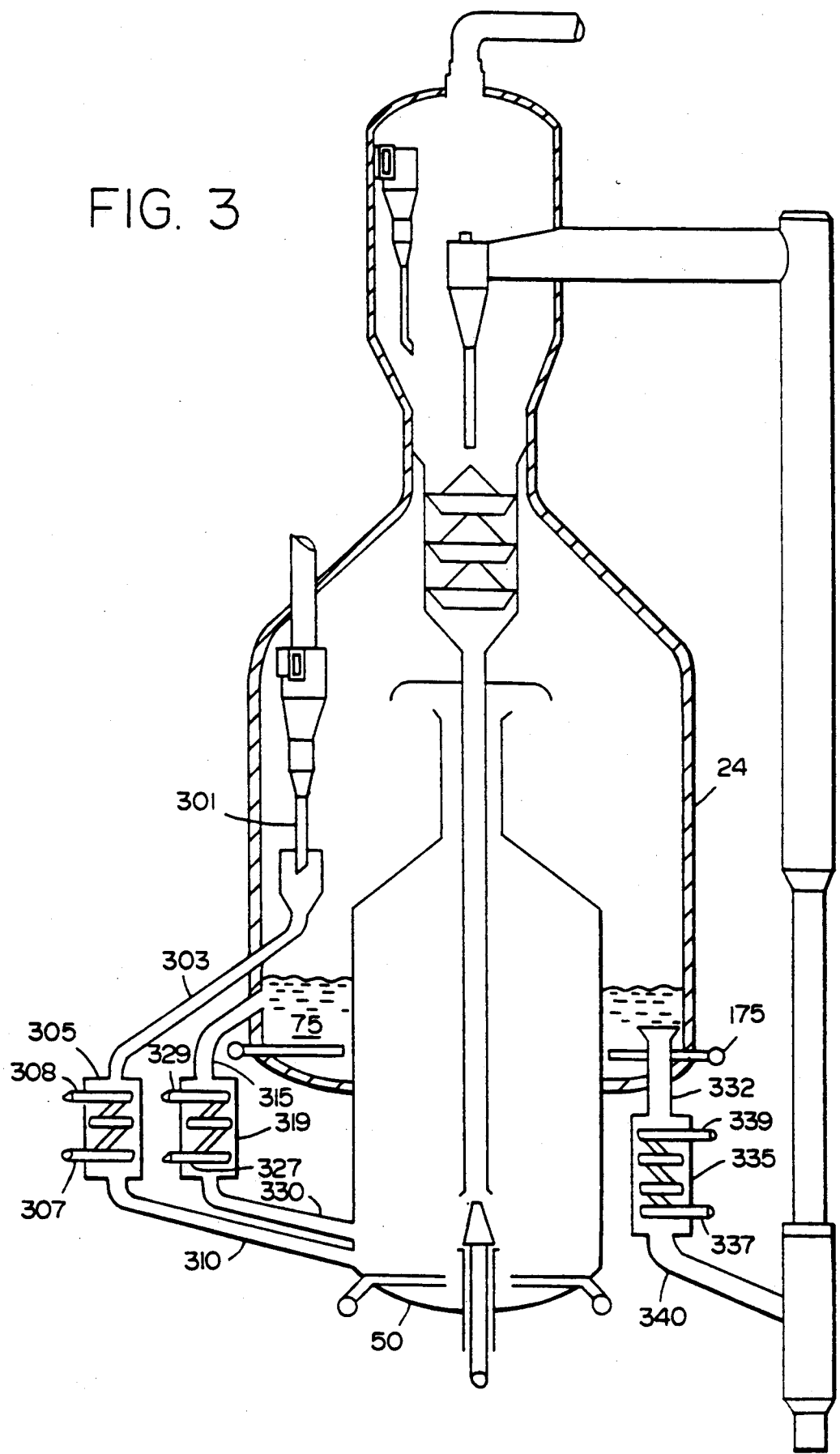
FIG. 3 is a schematic view of a preferred embodiment of the invention, showing catalyst coolers in three locations of the regenerator.

FIG. 3 shows several different ways in which heat can be removed from around the regenerator 24. In most units, only one or two methods of heat removal would be practiced, but three methods of heat removal are shown, and all three could be practiced simultaneously. All three modes of heat removal are in addition to the catalyst cooler shown in FIG. 1 (prior art), wherein catalyst is removed from the dense bed, heat is removed from the catalyst, and the catalyst is returned to the dense bed.

In the process and apparatus of the present invention heat can be removed from the catalyst recycled to the FFB region from either the dense bed or from a cyclone dipleg. When the highest grade steam is needed, it may be beneficial to remove heat from catalyst recycled from the hottest place in the regenerator, which will usually be the catalyst recovered from cyclone diplegs. As shown in FIG. 3, catalyst is withdrawn from dipleg 301, passed via line 303 into heat exchange means 305. Usually it will be a conventional catalyst cooler, such as the cooler 28 shown in FIG. 1. A heat exchange fluid, usually water or low grade steam will be added to the unit via line 307 and removed via line 308. Resulting cooled catalyst can be charged to the FFB region of coke combustor 50 via line 310.

Heat removal from a catalyst recycle line associated with the dense bed region 75 can also be practiced. In this embodiment, a line 315 removes catalyst from the dense phase region 75 of the FFB, and passes it through heat exchange means 319, where a cool incoming fluid in line 327 is heated and then removed via line 329. The cooled catalyst will then be charged via line 330 to the FFB region, usually for the purpose of heating the incoming spent catalyst.

Heat removal from a hot catalyst stream (in line 310 or line 330) which is added to the FFB region to provide heat may seem counterproductive, but it is beneficial in several instances. In some cases it will be beneficial to remove heat from a catalyst recycle line, because much of the cost of a heat exchanger is installing a line for flow of catalyst to and from the exchanger. Once a line is installed, the marginal cost of putting a heat exchanger in the line is less than, e.g., adding an additional heat exchanger connective with the dense bed region. It is also desirable to be able to add fairly hot regenerated catalyst which does a moderately effective job of heating (to promote coke combustion) then acts as a diluent or heat sink to minimize localized high temperatures, because localized high temperatures can lead to rapid catalyst deactivation.

Another mode of heat exchange, not shown, which can be used to connect a heat exchange "thimble" to a vessel connected with, and open to, the dense bed region 75 or even to the FFB region. Catalyst flow to such a thimble can be controlled by control of the amount of fluidizing gas added to the thimble. Catalyst will flow naturally into the thimble, and be swept out by the action of the fluidizing gas.

A preferred method of heat removal is to install a heat removal means 335 in the transfer line 332 removing catalyst from the dense bed region and returning it to the reactor. A cool fluid can be added via line 337, heat exchanged, and removed via line 339. Cooled catalyst is then transmitted to the riser reactor via line 340. This means that a much cooler catalyst will be used in the reactor, so higher cat:oil ratios can be achieved in the unit, with consequent increases in conversion and gasoline yields.

DESCRIPTION OF PREFERRED EMBODIMENTS

FCC FEED

Any conventional FCC feed can be used. The process of the present invention is especially useful for processing difficult charge stocks, those with high levels of CCR material, exceeding 2, 3, 5 and even 10 wt% CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids, and mixtures thereof. The present invention is most useful with feeds having an initial boiling point above about 650° F.

The most uplift in value of the feed will occur when a significant portion of the feed has a boiling point above about 1000° F., or is considered non-distillable, and when one or more heat removal means are provided in the regenerator, as shown in FIG. 1 or in FIG. 3.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5–40 wt.% of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt% RE.

Relatively high silica zeolite containing catalysts are preferred for use in the present invention. They withstand the high temperatures usually associated with complete combustion of CO to CO2 within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1–12, and typified by ZSM-5, and other materials having a similar crystal structure), adsorb SOX (alumina), remove Ni and V (Mg and Ca oxides).

Good additives for removal of SOx are available from several catalyst suppliers, such as Davison's "R" or Katalistiks International, Inc.'s "DeSox."

CO combustion additives are available from most FCC catalyst vendors.

The FCC catalyst composition, per se, forms no part of the present invention.

CRACKING REACTOR/STRIPPER/REGENERATOR

The FCC reactor, stripper and regenerator shell 24, per se. are conventional, and are available from the M. W. Kellogg Company.

The modifications needed to add the combustor pod, or FFB region within, or built partially into, the base of the existing regenerator shell 24 are well within the skill of the art.

COMBUSTOR POD PROCESS CONDITIONS

Conditions in the combustor pod, or FFB region, and in the dilute phase transport riser contiguous with and above it, are very similar to those used in conventional High Efficiency Regenerators (HER) now widely used in FCC units. Typical H.E.R. regenerators are shown in U.S Pat. No. 4,595,567 (Hedrick), U.S. Pat. No. 4,822,761 (Walters, Busch and Zandona) and U.S Pat. No. 4,820,404 (Owen), which are incorporated herein by reference.

The conditions in the combustor pod comprise a turbulent or fast fluidized bed region in the base, and approach dilute phase flow in the upper regions thereof. These conditions are conventional, what is unconventional is achieving fast fluidized bed catalyst regeneration in a bubbling bed regenerator with a superimposed catalyst stripper discharging spent catalyst down directly into the regenerator via a standpipe within the dense bed regeneration vessel.

FCC REACTOR CONDITIONS

Conventional riser cracking conditions may be used. Typical riser cracking reaction conditions include catalyst/oil ratios of 0.5:1 to 15:1 and preferably 3:1 to 8:1, and a catalyst contact time of 0.1 to 50 seconds, and preferably 0.5 to 5 seconds, and most preferably about 0.75 to 2 seconds, and riser top temperatures of 900° to about 1050° F.

CO COMBUSTION PROMOTER

Use of a CO combustion promoter in the regenerator or combustion zone is not essential for the practice of the present invention, however, it is preferred. These materials are well-known.

U.S. Pat. No. 4,072,600 and U.S. Pat. No. 4,235,754, which are incorporated by reference, disclose operation of an FCC regenerator with minute quantities of a CO combustion promoter. From 0.01 to 100 ppm Pt metal or enough other metal to give the same CO oxidation, may be used with good results. Very good results are obtained with as little as 0.1 to 10 wt. ppm platinum present on the catalyst in the unit.

We claim:

1. A process for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst to which an oxygen containing regeneration gas is added and from which hot regenerated catalyst is withdrawn and recycled to said riser reactor, characterized by:

discharging said stripped catalyst from said catalyst standpipe into a closed coke combustor vessel which is at least partially immersed in said bubbling dense bed, said coke combustor vessel having a base region with a cross sectional area and an upper region of reduced cross sectional area relative to said base region;

adding an oxygen containing regeneration gas to said coke combustor vessel in an amount sufficient to provide a superficial vapor velocity which will maintain a majority of the catalyst therein in a state of turbulent or fast fluidization;

transferring said catalyst from said base region of said coke combustor to said upper region of said coke combustor having a reduced cross sectional area, whereby increasing the superficial vapor velocity and causing dilute phase catalyst transport in said upper region;

discharging at least partially regenerated catalyst from said upper region into a dilute phase transport riser connective with said coke combustor vessel, said dilute phase transport riser extending into said dilute phase region within said regenerator vessel containing said bubbling fluidized bed; and discharging at least partially regenerated catalyst from said dilute phase transport riser and collecting said regenerated catalyst in said bubbling fluidized bed.

2. The process of claim 1 wherein the stripper standpipe and the dilute phase transport are axially aligned, and the stripper standpipe passes through the dilute phase transport riser.

3. The process of claim 2 wherein the catalyst in the stripper standpipe is indirectly and countercurrently heat exchanged with hot regenerated catalyst in the dilute phase transport riser.

4. The process of claim 1 wherein catalyst from said bubbling dense bed is added to said coke combustor to heat stripped catalyst by direct contact heat exchange.

5. The process of claim 1 wherein cyclones are provided in the dilute phase region above the bubbling dense bed for recovery of regenerated catalyst in said dilute phase region, and at least a portion of the catalyst recovered from said cyclones is added to said coke combustor to heat stripped catalyst by direct contact heat exchange.

6. The process of claim 4 wherein a heat exchange means cools catalyst recycled from said bubbling dense bed to said coke combustor vessel.

7. The process of claim 5 wherein a heat exchange means cools catalyst recycled from said cyclones to said coke combustor vessel.

8. The process of claim 1 wherein a heat exchange means cools catalyst withdrawn from said bubbling dense bed and recycled to said catalytic cracking process.

9. The process of claim 1 wherein a catalyst/flue gas separation means is provided at the outlet of said dilute phase transport riser to provide a catalyst rich phase which is discharged down into said bubbling dense bed and a catalyst lean dilute phase which is discharged into the dilute phase region above said bubbling dense bed.

10. A process for the fluidized catalytic cracking of a heavy feed to lighter more valuable products by mixing, in the base of a riser reactor, a heavy crackable feed with a source of hot regenerated catalytic cracking catalyst withdrawn from a catalyst regenerator, and cracking said feed in said riser reactor to produce catalytically cracked products and spent catalyst which are discharged from the top of the riser into a catalyst disengaging zone wherein cracked products are separated from spent catalyst, spent catalyst is discharged from said disengaging zone into a catalyst stripper contiguous with and beneath said disengaging zone and wherein said spent catalyst is contacted with a stripping gas to produce stripped catalyst, and said stripped catalyst is collected in a vertical standpipe beneath the stripping zone and then discharged from said standpipe into a catalyst regeneration zone contiguous with and beneath said stripping zone, and said regeneration zone comprises a single dense phase bubbling fluidized bed of catalyst to which an oxygen containing regeneration gas is added and from which hot regenerated catalyst is withdrawn and recycled to said riser reactor, characterized by:

heating said stripped catalyst, by countercurrent indirect heat exchange with a dilute phase of at least partially regenerated catalyst, in said stripped catalyst standpipe;

discharging said heated stripped catalyst into a closed coke combustor vessel which is at least partially immersed in said bubbling dense bed, said coke combustor vessel having a base region with a cross sectional area and an upper region of reduced cross sectional area relative to said base region;

adding an oxygen containing regeneration gas to said coke combustor vessel in an amount sufficient to burn coke from said catalyst and to heat the catalyst as a result of coke combustion, and in an amount sufficient to provide a superficial vapor velocity which will maintain a majority of the catalyst therein as a fast fluidized bed;

transferring catalyst from said fast fluidized bed region to said upper region of said coke combustor having a reduced cross sectional area, whereby increasing the superficial vapor velocity and causing dilute phase catalyst transport in said upper region;

discharging at least partially regenerated catalyst from said upper region into a dilute phase transport riser connective with said coke combustor vessel, said dilute phase transport riser extending into said dilute phase region within said regenerator vessel containing said bubbling fluidized bed and being axially aligned with, and enclosing, a majority of said stripped catalyst standpipe; and discharging regenerated catalyst from said dilute phase transport riser and collecting said regenerated catalyst in said bubbling fluidized bed.

11. The process of claim 10 wherein a catalyst/flue gas separation means is provided at the outlet of said dilute phase transport riser to provide a catalyst rich phase which is discharged down into said bubbling dense bed and a catalyst lean dilute phase which is discharged into the dilute phase region above said bubbling dense bed.

12. The process of claim 10 wherein catalyst from said bubbling dense bed is added to said coke combustor to heat stripped catalyst by direct contact heat exchange.

13. The process of claim 10 wherein cyclones are provided in the dilute phase region above the bubbling dense bed for recovery of regenerated catalyst in said dilute phase region, and at least a portion of the catalyst recovered from said cyclones is added to said coke combustor to heat stripped catalyst by direct contact heat exchange.

14. The process of claim 12 wherein a heat exchange means cools catalyst recycled from said bubbling dense bed to said coke combustor vessel.

15. The process of claim 13 wherein a heat exchange means cools catalyst recycled from said cyclones to said coke combustor vessel.

16. The process of claim 10 wherein a heat exchange means cools catalyst withdrawn from said bubbling dense bed and recycled to said catalytic cracking process.

17. The process of claim 1 wherein additional combustion air is added to the bubbling dense bed in an amount sufficient to burn from 5 to 50% of the coke on spent catalyst.

18. The process of claim 10 wherein additional combustion air is added to the bubbling dense bed in an amount sufficient to burn from 5 to 50% of the coke on spent catalyst.

* * * * *